(12) United States Patent
Heinonen

(10) Patent No.: US 11,294,070 B2
(45) Date of Patent: Apr. 5, 2022

(54) METHOD AND SYSTEM FOR CORRECTING ERRORS IN LOCATION DATA

(71) Applicant: AI4 International Oy, Helsinki (FI)

(72) Inventor: Tero Heinonen, San Francisco, CA (US)

(73) Assignee: AI4 INTERNATIONAL OY, Helsinki (FI)

( * ) Notice: Subject to any disclaimer, the term of this patent is extended or adjusted under 35 U.S.C. 154(b) by 312 days.

(21) Appl. No.: 16/699,137

(22) Filed: Nov. 29, 2019

(65) Prior Publication Data

US 2021/0165108 A1 Jun. 3, 2021

(51) Int. Cl.
*G01S 19/40* (2010.01)
*G01S 19/07* (2010.01)
*G01S 19/44* (2010.01)
*G01S 19/41* (2010.01)
*H04W 4/44* (2018.01)

(52) U.S. Cl.
CPC .............. *G01S 19/40* (2013.01); *G01S 19/07* (2013.01); *G01S 19/41* (2013.01); *G01S 19/44* (2013.01); *H04W 4/44* (2018.02)

(58) Field of Classification Search
CPC ................................. G01S 19/40; G01S 19/07
USPC .................................................... 342/357.23
See application file for complete search history.

(56) References Cited

U.S. PATENT DOCUMENTS

| 10,215,571 B2 * | 2/2019 | Ghadiok ................ G01C 21/34 |
| 11,187,773 B2 * | 11/2021 | Ryden ................... G01S 5/0215 |
| 11,190,965 B2 * | 11/2021 | Ramos de Azevedo ................... H04W 36/32 |
| 2021/0364319 A1 * | 11/2021 | Abramson .......... G01C 21/3815 |

FOREIGN PATENT DOCUMENTS

| AU | 2008366038 A1 * | 7/2010 | ........... G01S 19/252 |
| CN | 106908054 A * | 6/2017 | |

* cited by examiner

*Primary Examiner* — Harry K Liu
(74) *Attorney, Agent, or Firm* — Ziegler IP Law Group, LLC

(57) ABSTRACT

A method for correcting errors in location data. The method provides a planned route of travel of vehicle to server system. The vehicle uses planned route to travel on a route of travel. The vehicle records location measurement raw data of vehicle using location measurement system in vehicle during travel. Moreover, the vehicle determines a relative location of each object of a plurality of objects present in a vicinity of the route of travel. The vehicle acquires a portion of a first set of location correction data streams from the server system. The vehicle utilizes the acquired portion of the first set to determine errors in the location measurement raw data to derive correct location data of the vehicle. A correct location of each object is derived based on the derived correct location data of vehicle for georeferencing plurality of objects.

15 Claims, 5 Drawing Sheets

METHOD AND SYSTEM FOR CORRECTING ERRORS IN LOCATION DATA

TECHNICAL FIELD

The present disclosure relates generally to georeferencing related technologies; and more specifically, to methods and systems for correcting errors in location data.

BACKGROUND

Typically, a process of acquiring digital sensor data and assigning geographical information to the acquired digital sensor data such that the sensor data can be assigned accurately to an appropriate real-world location is referred to as georeferencing. Georeferencing is utilised in several applications, ranging from map creation tools to navigation systems. For example, georeferencing is essential for Geographic Information System (GIS) that is designed to capture, store, manipulate, analyse, manage, and present types of geographical data for various georeferencing systems. Commonly, the georeferencing systems include, but not limited to, linear referencing systems, projections and coordinate systems, global positioning systems (GPS), geographic coordinate systems and so forth.

Conventionally, for georeferencing, remote sensing services are used, such as area mapping, surveying of locations, and industrial inspections. In remote sensing services, a vehicle, such as a rover, is used for collection of data (including digital sensor data). Typically, the rover drives on a terrain having objects. In order to map the objects to geographical coordinates for georeferencing, an accurate location of the rover on the terrain is needed. However, many drawbacks are associated with such conventional georeferencing techniques. Notably, georeferencing is performed in an offline environment, which can be a server, computer, or a cloud computing environment, where the data from the remote sensing service needs to be transferred first before georeferencing. The digital sensor data such as LiDAR data, images, and videos provide massive amounts of data that needs to be uploaded on a computing environment. For example, a rover can generate 100 Gigabytes (GB) of LiDAR data per hour, 70 GB of Joint Photographic Expert Group (JPG) compressed images per day, and 4K resolution video 1720 GB per hour. Uploading such huge amount of data on the cloud server is time consuming, thus conventional techniques requires several days, weeks or even months for georeferencing. Furthermore, many applications require high-accuracy georeferenced data. In an example, for industrial and infrastructure inspections and for autonomous driving maps, less than 10 centimetres (cm) of absolute positioning is needed, whereas for city planning and zoning, less than 1 cm of absolute positioning is needed. Typically, achieving such accuracy requires satellite correction data from multiple base stations having fixed locations and it further requires use of all the satellite correction data simultaneously. Generally, the satellite correction data is only available from service providers at 60 minutes or 15 minutes (high frequency) intervals. Moreover, satellite correction systems for GNSS data such as Real-Time Kinematic (RTK) system and Precise Point Processing (PPP) systems alone when used online do not provide accuracy required by various applications, especially these systems are not accurate enough if the positioning is attempted online (i.e. at real-time). This is due to the accurate position estimation requiring state (trajectory) estimation in two direction with respect to time namely forward in time and backward in time. Backward in time is not naturally available for real-time positioning (as that requires information from the future). Furthermore, conventional techniques where georeferencing is performed in a computing environment may cause threat to a security sensitive data, such as data regarding the locations related to national security or commercial trade secrets. Therefore, it can be inferred that the conventional georeferencing techniques require huge amount of data transfer, they are time consuming, produce inaccurate results, and are thus inefficient and unreliable.

Therefore, in light of the foregoing discussion, there exists a need to overcome the aforementioned drawbacks associated with conventional georeferencing techniques.

SUMMARY

The present disclosure seeks to provide a method for correcting errors in location data. The present disclosure also seeks to provide a system for correcting errors in location data. The present disclosure seeks to provide a solution to the existing problem of inaccurate detection of geographical location of objects. An aim of the present disclosure is to provide a solution that overcomes at least partially the problems encountered in prior art, and provide a method and a system that is time efficient, computationally light, accurate, and reliable.

In one aspect, an embodiment of the present disclosure provides a method for correcting errors in location data, the method comprising:
  providing a planned route of travel of a vehicle to a server system;
  using the planned route of travel to travel, with the vehicle, a route of travel;
  recording, by the vehicle, a location measurement raw data of the vehicle using a location measurement system in the vehicle during the travel;
  determining, by the vehicle, a relative location of at least one object of a plurality of objects present in a vicinity of the route of travel with respect to a position of the vehicle;
  acquiring, by the vehicle, a portion of a first set of location correction data streams from the server system, wherein the acquired portion comprises a second set of location correction data stream; and
  utilizing, by the vehicle, the acquired portion of the first set of location correction data streams to determine errors in the location measurement raw data to derive correct location data of the vehicle from the location measurement raw data; and
  deriving correct location of each object of the plurality of objects based on the derived correct location data of the vehicle for georeferencing of the plurality of objects.

In another aspect, an embodiment of the present disclosure provides a system for correcting errors in location data, the system comprising:
  control circuitry and a location measurement system in a vehicle, wherein the control circuitry is configured to:
    provide a planned route of travel of a vehicle to a server system;
    use the planned route of travel to travel, with the vehicle, a route of travel;
    record a location measurement raw data of the vehicle using a location measurement system in the vehicle during the travel;

determine a relative location of at least one object of a plurality of objects present in a vicinity of the route of travel with respect to a position of the vehicle;

acquire a portion of a first set of location correction data streams from the server system, wherein the acquired portion comprises a second set of location correction data stream;

utilize the acquired portion of the first set of location correction data streams to determine errors in the location measurement raw data to derive correct location data of the vehicle from the location measurement raw data; and derive correct location of each object of the plurality of objects based on the derived correct location data of the vehicle for georeferencing of the plurality of objects.

Embodiments of the present disclosure substantially eliminate or at least partially address the aforementioned problems in the prior art, and enable determination of errors associated with the location measurement raw data of the vehicle to be fast, thereby, allowing determination of correct location measurement data of the vehicle. Moreover, the correct location measurement data of the vehicle is utilised to accurately derive the location of each object, such as the derived location is potentially used for georeferencing. Moreover, the method described in the present disclosure is time efficient and reliable.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
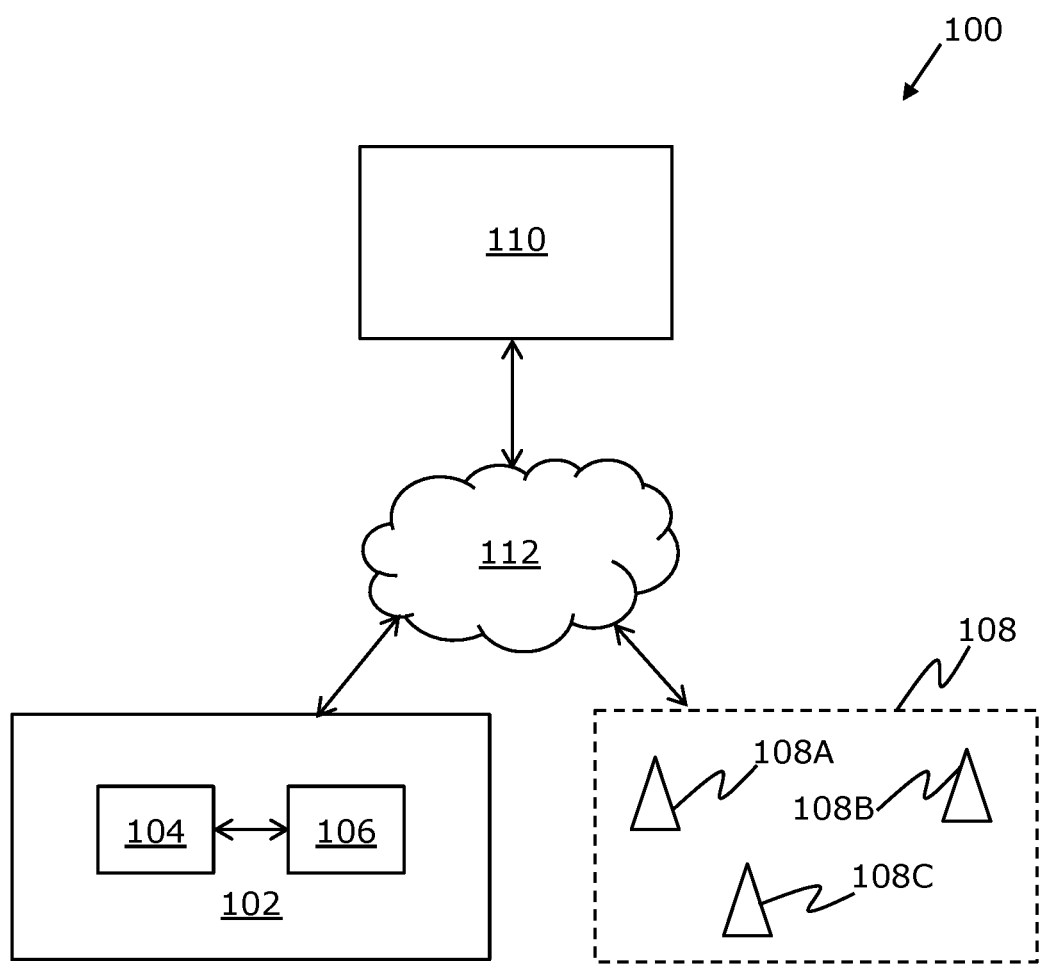
FIG. 1 is a block diagram of a system for correcting errors in location data, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for correcting errors in location data, the method comprising:

providing a planned route of travel of a vehicle to a server system;

using the planned route of travel to travel, with the vehicle, a route of travel;

recording, by the vehicle, a location measurement raw data of the vehicle using a location measurement system in the vehicle during the travel;

determining, by the vehicle, a relative location of at least one object of a plurality of objects present in a vicinity of the route of travel with respect to a position of the vehicle;

acquiring, by the vehicle, a portion of a first set of location correction data streams from the server system, wherein the acquired portion comprises a second set of location correction data stream; and utilizing, by the vehicle, the acquired portion of the first set of location correction data streams to determine errors in the location measurement raw data to derive correct location data of the vehicle from the location measurement raw data; and deriving correct location of each object of the plurality of objects based on the derived correct location data of the vehicle for georeferencing of the plurality of objects.

In another aspect, an embodiment of the present disclosure provides a system for correcting errors in location data, the system comprising:

control circuitry and a location measurement system in a vehicle, wherein the control circuitry is configured to:

provide a planned route of travel of a vehicle to a server system;

use the planned route of travel to travel, with the vehicle, a route of travel;

record a location measurement raw data of the vehicle using a location measurement system in the vehicle during the travel;

determine a relative location of at least one object of a plurality of objects present in a vicinity of the route of travel with respect to a position of the vehicle;

acquire a portion of a first set of location correction data streams from the server system, wherein the acquired portion comprises a second set of location correction data stream;

utilize the acquired portion of the first set of location correction data streams to determine errors in the location measurement raw data to derive correct location data of the vehicle from the location measurement raw data; and derive correct location of each object of the plurality of objects based on the derived correct location data of the vehicle for georeferencing of the plurality of objects.

The present disclosure provides the method and the system for correcting errors in the location data. The disclosed system acquires only relevant and comparatively miniscule data (i.e. the aforementioned portion of the first set of location correction data streams from the server system). Consequently, the data transfer between the server system and the vehicle is minimised as there may be several location correction data streams available from a plurality of base stations but only the relevant location correction data streams are potentially acquired from one or more base stations of the plurality of base stations. Thus, the processing of the location correction data streams is optimized and is thus faster as compared to the processing performed by the vehicle if all the location correction data streams are acquired from the server system. Hence, the method for correcting errors in the location data is fast and therefore, time efficient and computationally light. The acquired portion of the set of location correction data streams is utilized to determine errors in the location measurement raw data to derive correct location data of the vehicle. Moreover, a calculation period of determination of the errors is relatively less as compared to the conventional systems, for example, about 1 minute. Thus, the determination of the errors by the vehicle is fast as well as accurate as the processing required by the vehicle is significantly reduced. Once the correct location of the vehicle is determined, such correct location data of the vehicle is then used to derive correct location of each object of the plurality of objects, which in turn enables highly accurate georeferencing of the plurality of objects. Further, the georeferenced data can be made available in a fraction of the time period, e.g. if the georeferenced data is recorded for 15 minutes (a given time period), the method can be implemented in less than 5 minutes in a typical control circuitry of the vehicle. Moreover, if the server system connectivity is not immediately available, the processing of the data for given time period(s) can be done whenever the connectivity is restored. Furthermore, the georeferenced data may be utilised in near real-time systems for automated or manual analysis. Particularly, such systems (such as the disclosed system) is also beneficial for time sensitive analysis.

In an exemplary implementation, in case of sensitive data (such as data regarding the locations related to national security or commercial trade secrets), the data (e.g. collected from vehicle sensors) can be processed entirely in the vehicle without the need to send the data over potentially unsecure communication links to a potentially unsecure server environment. Notably, the data processed in cloud consists only of public information. Thus, such a system where the processing is performed in the vehicle itself is another advantage over the state of the art, in which there is a risk of data spillage to the data in transit, such as at cloud storage and so forth. Furthermore, the system described in the present disclosure requires almost no or negligible human intervention, and the end-to-end process is fast, robust, and computationally light. Thus, the present disclosure provides the method for correcting errors in the location data that allows reduction in the amount of data transfer between the vehicle and the server system, and enables expedition in a process of the determination of the errors in the location measurement raw data, thereby providing the method that is time efficient, accurate, and reliable.

The method for correcting errors in location data comprises providing a planned route of travel of the vehicle to a server system. The planned route of travel of the vehicle may be provided to the server system by the vehicle, or it may be set by the server system. The errors refer to a difference in an estimated location of an object and an actual location of the object in a geographical area. In an example, the geographical area is a terrain comprising a plurality of objects, such as trees, buildings, check posts, electric poles, and so forth. For example, the estimated location of an object, such as a tree is 20 centimeters (cm) away from the actual location of the tree. Thus, the error in location data associated with the object tree is 20 cm. Notably, the errors are potentially caused due to poor reception of satellite signals, limited number of satellite signals received, by ambiguous information received from the satellites, noise in satellite geometry or satellite orbits, multipath effect, atmospheric effects, clock inaccuracies and rounding errors.

Moreover, the vehicle is defined as a remote sensing platform that is configured to travel on a given route in order to collect and process data, such as the location data required for georeferencing. In an example, the vehicle is a rover and the given route is defined on the terrain. The planned route of travel of the vehicle is the defined route such that the vehicle is required to guide along the planned route to take one or more measurements associated with at least one object in the geographical area.

Alternatively, the vehicle may be a satellite, fixed wing aircraft, rotary wing aircraft, a drone, a surface vehicle such as a boar, a submarine, or a ground vehicle. Furthermore, the vehicle may be a portable unit by a person. The planned route of travel, the route to follow, or the actual route travelled may be either 2D such as for terrain-following ground vehicles or it may be a 3D route consisting of three coordinates for space, aerial or submarine vehicles.

Furthermore, the vehicle comprises a control circuitry and the location measurement system. In accordance with the present disclosure, the term "control circuitry" refers to a computational element that is configured to respond to and process instructions that drive the aforementioned system of correcting errors in the location data. Optionally, the control circuitry includes, but is not limited to, a microprocessor, a microcontroller, a complex instruction set computing (CISC) microprocessor, an application-specific integrated circuit (ASIC), a reduced instruction set (RISC) microprocessor, a very long instruction word (VLIW) microprocessor, or any other type of processing or control circuitry. Furthermore, the control circuitry may refer to one or more individual processors, processing devices, a processing unit that is part of a machine, and various elements associated with the system. The control circuitry of the vehicle may provide the planned route from the location measurement system to the server system. The planned route of the travel is sent over a communication network to the server system. Optionally, the vehicle may also send actual location information of the objects, or send multiple routes that may be used by the vehicle.

Throughout the present disclosure, the term "server system" refers to a structure and/or module that include programmable and/or non-programmable components configured to store, process and/or share information, such as location correction data streams, location measurement raw data, georeferenced data and the like. Optionally, the server system includes any arrangement of physical or virtual computational entities capable of enhancing information to perform various computational tasks. Furthermore, it should be appreciated that the server system may be both single hardware server and/or plurality of hardware servers operating in a parallel or distributed architecture. Moreover, the server system may be a cloud server. In an example, the server may include components such as memory, a processor, a network adapter and the like, to store, process and/or share information with other computing components, such as the vehicle. Optionally, the server system is implemented as a computer program that provides various services (such as database service) to other devices, modules or apparatus.

Moreover, the location measurement system refers to a system that utilizes satellites, receivers and so forth to measure the location of the phase center of the receiver antenna (APC) and determine the location data. According to an embodiment, the location measurement system includes at least a global navigation satellite system (GNSS) receiver. The GNSS system utilises satellites to provide autonomous geo-spatial positioning. Optionally, the GNSS includes, but not limited to, a global positioning system (GPS), a Global Navigation Satellite System (GLONASS), a Galileo Public Regulated Service (PRS), a BeiDou Navigation Satellite System (BDS), or other global or regional navigation satellite systems. More optionally, the vehicle further comprises an inertial measurement unit (IMU) and a clock. The IMU refers to one or more electronic devices that tracks the location of the vehicle in the geographical area by employing a plurality of measurement sensors such as an accelerometer, gyros, cameras or LIDAR sensors and the like. Optionally, the vehicle further comprises a camera, such as a two-dimensional (2D) camera, a 3D camera, an infrared camera and the like. Optionally, the vehicle further comprises of a LiDAR, a RADAR and the like. The plurality of measurement sensors and the camera are arranged at one or more positions and a direction with respect to the vehicle, the IMU, and the APC.

Moreover, the method comprises using the planned route of travel to travel, with the vehicle, a route of travel. The route of travel is the actual route of travel used to travel by the vehicle in the geographical area, such as on the terrain of the geographical area, or in the air with varying altitude and location. In an example, in certain scenarios, the planned route of travel may face an obstruction, such as stones, in a path of the planned route of travel. In such scenarios, the vehicle, may bypass each of the obstructions and may travel on a certain deviated route than the planned route of travel, such that the deviated route is the route of travel (i.e. the actual route) of the vehicle. Optionally, the route of travel is regularly updated and communicated to the server system via the communication network. If the server system is not available, the route of travel is communicated to the server system after the vehicle regains connectivity with the server system.

Furthermore, the method comprises recording, by the vehicle, a location measurement raw data of the vehicle using the location measurement system in the vehicle during the travel. The location measurement raw data may optionally consist of a combination of pseudorange, carrier-phase, Doppler and signal-to-noise from GPS (including GPS modernization signals e.g. L5 and L2C), GLONASS, Galileo, Beidou, along with data from EGNOS and WAAS satellite based augmentation systems (SBAS), QZSS, simultaneously.

The vehicle obtains its geographical location in terms of geographical coordinates with respect to earth using the location measurement system. As stated above, the location measurement system comprises the GNSS receiver and the IMU. In an example, the geographical coordinate system is a World Geodetic System (WGS)—WGS84 or any other geographical coordinate system that is a used standard for a particular geographical area. The geographical coordinates with respect to the earth possess inherent location errors, in any geographical coordinate system. Notably, the errors in the location data are potentially caused due to poor reception of satellite signals, limited number of satellite signals received, by ambiguous information received from the satellites, noise in satellite geometry or satellite orbits, multipath effect, atmospheric effects, clock inaccuracies and rounding errors.

Moreover, the method comprises determining, by the vehicle, a relative location of at least one object of a plurality of objects present in a vicinity of the route of travel with respect to a position of the vehicle. As the vehicle travels on the route of travel, the vehicle makes plurality of measurements with help of the plurality of measurement sensors about at least one object that is in vicinity of the route of travel. The plurality of measurements are potentially used by the vehicle to determine the relative location of measured objects of a plurality of objects present in vicinity of the route of travel with respect to a position of the vehicle. In an example, the plurality of objects are the objects that are intended to be georeferenced.

According to an embodiment, the method comprises acquiring, by the server system, a first set of location correction data streams from one or more base stations of a plurality of base stations. The location measurement systems, such as GNSS requires setup comprising at least satellites and the plurality of base stations, such as the plurality of base stations are setup in the geographical area at certain distances. The plurality of base stations are typically installed at fixed geographical coordinates. The plurality of base stations receives satellite data from various satellites of the GNSS. The first set of location correction data streams are generated for a given geographical area by the plurality of base stations. In an implementation, the server system receives the first set of location correction data streams from the plurality of base stations. For example, the server system receives the location correction data streams from two base stations out of four base stations, depending upon a relevance of the location correction data streams from each of the four base stations.

According to an embodiment, the method comprises deriving, by the server system, the second set of location correction data streams from the first set of location correction data streams based on a geography associated with at least one of: the planned route of travel of the vehicle, the route of travel of the vehicle, a measured route of travel, or a forecasted route of travel. The second set of location correction data streams is a subset of the first set of location correction data streams. The measured route of travel is a route that is potentially measured by GNSS receiver of the vehicle or estimated by the server system during the actual route of travel. The forecasted route of travel is a route or a plurality of route forecasted for the vehicle ahead of the time of travel. The second set of location correction data streams is obtained via one or more base stations of the plurality of base stations by the server system, depending upon the geography associated with at least one of the planned route of travel of the vehicle, the route of travel of the vehicle, measured route of travel or forecasted route of travel. Thus, the server system may only store and process the relevant location correction data streams from the first set of the location correction data streams. The method of storing and processing of only the relevant location correction data streams allows reduction in the amount of data transfer, such as transfer of the relevant location data streams between the vehicle and the server system. Thus, the method for correcting errors in the location data is fast and computationally light.

According to an embodiment, the method further comprises estimating, by the vehicle, the one or more time periods in which the vehicle is expected to be present in corresponding geographical areas covered by each of the one or more base stations based on the planned route of travel. For example, a first base station of the plurality of base stations covers a first geographical area. The vehicle estimates a time period for which the vehicle is expected to be present in the first geographical area while travelling in accordance with the planned route of travel. Moreover, in the above example, a second base station of the plurality of base stations covers a second geographical area. The vehicle estimates a time period for which the vehicle is expected to be present in the second geographical area in accordance with the planned route of travel. Furthermore, the vehicle also estimates a time period for which the vehicle is expected to be present in a common geographical area covered by the first base station as well as the second base station while travelling on the planned route of travel. Optionally, the vehicle also uses a speed of travel thereof to estimate the one or more time periods. According to an embodiment, the method comprises utilizing, by the server system, the estimated the one or more time periods to derive the second set of location correction data streams relevant to the planned route of travel of the vehicle.

According to an embodiment, the second set of location correction data streams comprises a relevant location correction data streams from one or more base stations for one or more time periods in accordance with a geographical area covered by the one or more base stations with respect to a timing associated with at least one of: the planned route of travel of the vehicle, the route of travel of the vehicle, the measured route of travel, or the forecasted route of travel. In an example, the vehicle estimates a time period of travel in a first area covered by a first base station as 5 minutes. Further, the vehicle estimates a time period of travel in a second area covered by a second base station as 3 minutes. The vehicle communicates the estimated one or more time periods to the server system. The server system utilises the communicated one or more time periods from the vehicle to derive the second set of location correction data streams. Referring to the above-mentioned example, the second set of location correction data streams includes a location correction data stream from the first base station for 5 minutes and a location correction data stream from the second base station for 3 minutes.

Moreover, the method comprises acquiring, by the vehicle, a portion of a first set of location correction data streams from the server system, wherein the acquired portion comprises a second set of location correction data stream. The portion of the first set of location correction data streams is potentially the second set of location correction data stream comprising only the location correction data streams that are relevant to the planned route of travel. In other words, only the location correction data streams that are relevant to the planned route of travel is communicated to the vehicle. Such a method enables communication of limited amount of data, thereby minimising the amount of time required for data transmission. Therefore, the overall efficiency of the system is improved.

Furthermore, the method comprises utilizing, by the vehicle, the acquired portion of the first set of location correction data streams to determine errors in the location measurement raw data to derive correct location data of the vehicle from the location measurement raw data. The location correction data streams are based on, for example, difference between the satellite data and actual fixed geographical coordinates of the plurality of base stations. Since the plurality of base stations are installed in the fixed geographical coordinate, the calculated corrected value for each satellite signal may be obtained. In an example, the location correction may comprise of Differential Global Positioning system (DGPS), Precise Point Positioning (PPP), Satellite-based augmentation systems (SBAS), or alike. The acquired portion of the first set of location correction data streams that comprises the second set of location correction data streams are utilised to determine the errors in the location measurement raw data to derive correct location data of the vehicle. For example, the difference between the satellite data for a given base station and an actual fixed geographical coordinate of the given base station shows an error of 10 cm. Thus, such error is then used to adjust the location measurement raw data of the vehicle to derive the accurate location data of the vehicle.

According to an embodiment, the method further comprises performing one or more measurements for at least one object of the plurality of objects from one or more positions along the route of travel based on a number of location correction data streams of the first set of location correction data streams available for the one or more positions from the one or more base stations. The vehicle is configured to perform the one or more measurements for at least one object while moving on the route of travel. The one or more measurements for each object may vary depending upon the number of location correction data streams available for a particular geographical area from the server system in which the vehicle is moving at an instant of performing the one or more measurements of an object in the particular geographical area. The one or more measurements may also depend on a distance between the vehicle and the object. For example, the vehicle may perform three measurements for an object that is at a distance of 5-50 m from the vehicle, whereas the vehicle may perform one measurement for an object that is at a distance of 1-10 m from the vehicle.

According to an embodiment, the method further comprises performing a first set of measurements for a first object of the plurality of objects when location correction data streams from the first set of location correction data streams are available from at least a first set of base stations from a plurality of base stations for a common geographical area, wherein the vehicle moves along the route of travel in order to perform the first set of measurements along the route of travel that is covered within the common geographical area. In an example, the vehicle is moving in a common geographical area that is covered by the first set of base stations. The first set of base stations comprise three base stations. Thus, for measurement of the first object that lies within the common geographical area that is covered by the first set of base stations, the vehicle potentially requires to perform lesser number of measurements (e.g. a single measurement) as the location correction data streams are available from all three base stations of the plurality of base stations.

According to an embodiment, the method further comprises performing a second set measurements for a second object of the plurality of objects when location correction data streams from the first set of location correction data streams are available from at least a second set of base stations of the plurality of base stations for the common geographical area, wherein the vehicle moves along the route of travel in order to perform the second set of measurements along the route of travel that is covered within the common geographical area, and wherein a number of the second set of measurement is higher than a number of the first set of measurements and a number of base stations in the second set of base stations is lower than the number of base stations in the first set of base stations. In another example, the vehicle is moving in a common geographical area that is covered by the second set of base stations. The second set of base stations comprise, for example, only one or two base stations. Thus, for measurement of the second object that lies within the common geographical area that is covered by the second set of base stations, the vehicle potentially requires to perform more number of measurements, e.g., two or three measurements as the location correction data streams are available from two (or three) base stations of the plurality of base stations.

Furthermore, the method comprises deriving correct location of each object of the plurality of objects based on the derived correct location data of the vehicle for georeferencing of the plurality of objects. The derived correct location data of the vehicle from the location measurement raw data is used to derive the correct location of each object by performing one or more measurements associated with the object. In an example, a location measurement raw data of the vehicle depicts a geographical location of the vehicle as "G1". The vehicle determines error in the location measurement raw data to derive the correct location data of the vehicle as "G2". Moreover, the vehicle performs one or more measurements associated with a first object such that a geographical location of the first object is derived as "G3" with respect to the vehicle location "G1". Thus, the vehicle derives the correct location of the first object based on a difference between the vehicle location "G1" and the correct vehicle location "G2".

According to an embodiment, the method further comprises determining, by the vehicle, a current location of the vehicle by utilizing the location measurement raw data, the acquired portion of the first set of location correction data streams and updating in real time or near-real time a relative location of each object of the plurality of objects based on at least the determined current location of the vehicle, wherein the updated relative location corresponds to the correct location of each object of the plurality of objects. For example, DGPS is used to determine the current location of the vehicle on the terrain in the geographical area. Optionally, in addition to the DGPS, carrier-phase enhancement technique, such as Real-time kinematic (RTK) satellite navigation technique is used. Such a system employing both the DGPS and the RTK enhances overall accuracy of the system. The RTK satellite navigation technique utilise measurements of phase of a carrier wave signal in addition to information content of the carrier wave signal and further relies on a single reference base station of the plurality of base stations or interpolated virtual base station to provide real-time corrections. Such RTK satellite navigation technique provides up to centimetre-level accuracy. The enhancement in accuracy by using the technique is potentially high. For instance, in the case of the GPS, a coarse-acquisition (C/A) code, which is broadcast in a signal "L1", changes a phase at 1.023 Megahertz (MHz), but the L1 carrier itself is 1575.42 MHz, which changes phase over a thousand times more often. Thus, a ±1% error in the L1 carrier-phase measurement corresponds to a ±1.9 mm error in baseline estimation. Moreover, similar corrections may be calculated for location measurement systems such as GPS, GLONASS, Galileo Public Regulated Service (PRS) and a BeiDou Navigation Satellite System (BDS) and the like.

According to an embodiment, the determination of the current location of the vehicle on the route of travel is performed corresponding to a time period of a movement of the vehicle, and wherein the determination of the route of travel comprises vehicle state estimation. The vehicle state estimation relates to the determination of parameters associated with the vehicle such as lateral vehicle velocity of the vehicle, roll angle estimation of the vehicle and so forth. Optionally, the techniques used for the vehicle state estimation are Recursive Least Square (RLS) based technique, Kalman filter-based technique and the like.

In an exemplary scenario, vehicles, such as self-driving cars require accurate geographical maps that needs accuracy ranging from 1 cm to 10 cm (depending on a self-driving system of the self-driving cars). Notably, an accuracy below the above-mentioned range leads to a compromise in both operation and safety of the self-driving cars. Moreover, the environment changes often, such as there are road works, mud slides, flooding, objects on the road, and so forth. Thus, updating the geographical maps with the changed information as fast as possible is paramount to the safety and efficiency of self-driving cars. In this exemplary scenario, the disclosed method is potentially used in the self-driving cars to determine accurate location data of the objects in the route of travel of the car for safe navigation.

In another exemplary scenario, in electric distribution line inspections, there is a need to assess changes in structures (such as detached wires, deformed components, loose guy-wires, broken cross-arm and the like) with high amount of accuracy. The implementation of such inspections based on the accurate positioning in the location measurement system of the vehicle, such as a rover helps to detect the problems associated with the structures. Therefore, the rectification of the problems is faster than the conventional systems that require days or weeks for processing data in a cloud server and rectifying the problems.

The present disclosure also relates to the system as described above. Various embodiments and variants disclosed above apply mutatis mutandis to the system.

According to an embodiment, the control circuitry is further configured to estimate a one or more time periods in which the vehicle is expected to be present in corresponding geographical areas covered by each of the one or more base stations based on the planned route of travel.

According to an embodiment, the control circuitry is further configured to communicate the estimated one or more time periods along with the planned route of travel to the server system.

According to an embodiment, the system further comprises a plurality of measurement sensors, wherein the control circuitry is further configured to perform, by use of the plurality of measurement sensors, one or more measurements for each object of the plurality of objects from one or more positions along the route of travel based on a number of location correction data streams of the first set of location correction data streams available for the one or more positions from the one or more base stations.

According to an embodiment, the location measurement system includes at least a global navigation satellite system (GNSS) receiver, wherein the location measurement raw data is raw GNSS satellite data.

DETAILED DESCRIPTION OF THE DRAWINGS

Referring to FIG. 1, there is shown a block diagram of a system 100 for correcting errors in location data, in accordance with an embodiment of the present disclosure. The system 100 comprises a vehicle 102 that comprises control circuitry 104 and a location measurement system 106. The system 100 further comprises a plurality of base stations 108, such as base stations 108A, 108B, and 108C. Moreover, the system 100 comprises a server system 110 and a communication network 112, such that the vehicle 102, the plurality of base stations 108 and the server system 110 are communicatively coupled via the communication network 112.

The control circuitry 104 is configured to provide a planned route of travel of the vehicle 102 to the server system 110. The control circuitry 104 is further configured to use the planned route of travel to travel, with the vehicle 102, a route of travel. Moreover, the control circuitry 104 is configured to record a location measurement raw data of the vehicle 102 using the location measurement system 106 in the vehicle 102 during the travel. Furthermore, the control circuitry 104 determines a relative location of at least one object of a plurality of objects present in a vicinity of the route of travel with respect to a position of the vehicle 102. The control circuitry 104 further acquires a portion of a first set of location correction data streams from the server system 110, wherein the acquired portion comprises a second set of location correction data stream. Moreover, the control circuitry 104 is configured to utilize the acquired portion of the first set of location correction data streams to determine errors in the location measurement raw data to derive correct location data of the vehicle 102 from the location measurement raw data. The control circuitry 104 is further configured to derive correct location of each object of the plurality of objects based on the derived correct location data of the vehicle 102 for georeferencing of the plurality of objects.

Figure 2:
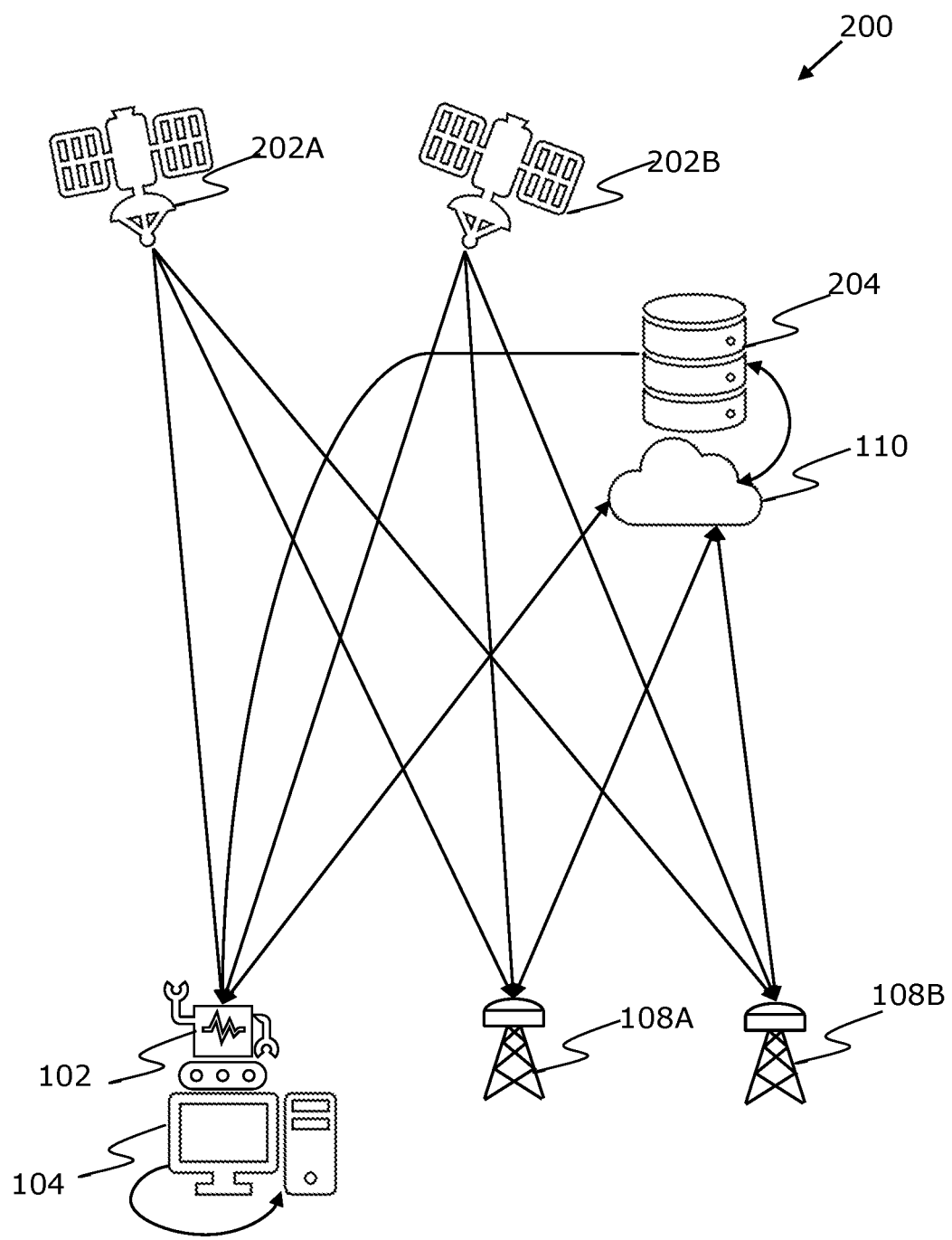
FIG. 2 is a schematic illustration of a system for correcting errors in location data, in accordance with an embodiment of the present disclosure.

Referring to FIG. 2, there is shown a schematic illustration of a system 200 for correcting errors in location data, in accordance with an embodiment of the present disclosure. The system 200 comprises the vehicle 102, for example a rover that comprises a control circuitry 104, such as a processor. The system 200 further comprises satellites 202A and 202B that transmit satellite data to the plurality of base stations 108A and 108B and the vehicle 102. Further, the system 200 comprises the server system 110 and a database arrangement 204. Optionally, the database arrangement 204 is a part of the server system 110. The server system 110 receives the first set of location correction data streams from the plurality of base stations 108A and 108B. Alternatively, the server system 110 acquires only a portion of the first set of location correction data streams from the plurality of base stations 108A and 108B. The server system 110 processes and compresses the first set of location correction data streams and stores the first set of location correction data streams in the database arrangement 204. In this present implementation, the server system 110 is a cloud-based server system. Additionally, the server system 110 transmits a portion of the first set of location correction data streams stored in the database arrangement to the vehicle 102.

Figure 3:
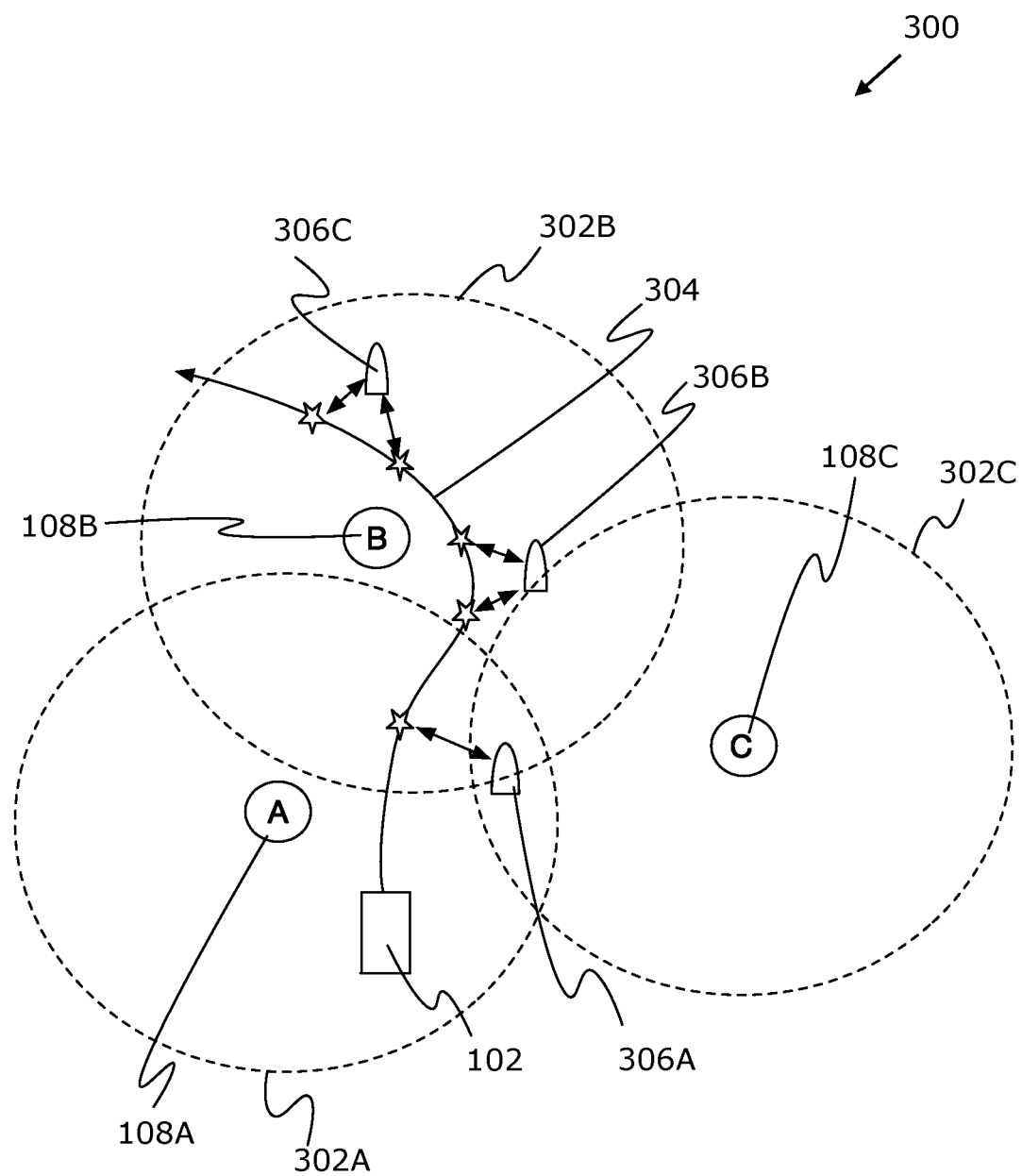
FIG. 3 is an exemplary scenario for implementation of a system for correcting errors in location data, in accordance with an embodiment of the present disclosure.

Referring to FIG. 3, there is shown an exemplary scenario for implementation of a system 300 for correcting errors in location data, in accordance with an embodiment of the present disclosure. The system 300 comprises the base station 108A, 108B and 108C and the vehicle 102. In the system 300, the vehicle 102 is implemented as a rover. Further, geographical areas covered by the base station 108A, 108B and 108C are represented as geographical area 302A, geographical area 302B and geographical area 302C respectively. Furthermore, the vehicle 102 travels a route of travel 304. Moreover, the system 300 comprises an object 306A, an object 306B and an object 306C of the plurality of objects. In the exemplary scenario, the vehicle 102 is expected to travel via the geographical areas 302A and 302B according to the planned route of travel, thus excluding the geographical area 302C. Therefore, the location correction data stream provided by the base station 108C does not need to be provided to the server system, hence it decreases a need for extra communication capacity as well as it reduces a load on the server system. The vehicle 102 is configured to estimate one or more time periods for which the rover is expected to travel in each of the geographical area 302A, geographical area 302B and geographical area 302C respectively. For example, an estimated time of travel by the vehicle 102 is a total of 8 minutes. The vehicle 102 estimates a time period of travel in the geographical area 302A as three minutes. Moreover, the vehicle 102 estimates a time period of travel in a common geographical area of the geographical area 302A and the geographical area 302B as two minutes.

Furthermore, the vehicle 102 estimates a time period of travel in the geographical area 302B as three minutes. Therefore, the location correction data stream by the base station 108A is provided in the first three minutes, the location correction data streams by the base stations 108A and 108B are provided for the next two minutes and the location correction data stream by the base station 108B is only provided for the last three minutes of travel of the vehicle 102. The aforementioned location correction data streams are stored in the server system and are provided to the vehicle 102 for post processing measurement data for example at an instant of 9 minutes from beginning of the travel of the rover. Therefore, only a small portion of the location correction streams needs to be provided to the location measurement system in the vehicle 102 at a time, thereby reducing a load on communication network as well as processing needs in the location measurement system of the vehicle 102. As the vehicle 102 travels on the route of travel 304, the vehicle 102 records measurements with help of the measurement sensors for the object 306A, the object 306B and the object 306C. The recording of the measurements can be continuous or may be done from time to time. The vehicle 102 performs one or more measurements for each object based on a number of location correction data streams of the first set of location correction data streams. The vehicle 102 estimates a time period for which the vehicle 102 travels in a specific geographical location covered by each base stations 108A and 108B of the plurality of base stations. Thus, in this scenario, the vehicle 102 performs one measurement for the object 306A as for the object 306A, there are two location correction data streams available from the base stations 108A and 108B. Further, the vehicle 102 may perform two measurements for the object 306C as for the object 306C, there is only one location correction data stream available from the base station 108B. Thus, the present disclosure provides the method that enables to provide a compact set of location correction streams to the location measurement system to post process collected locations to make the collected locations as precise locations, such as based on tolerances, e.g., +−1 cm, +−5 cm +−10 cm and the like.

Figure 4:
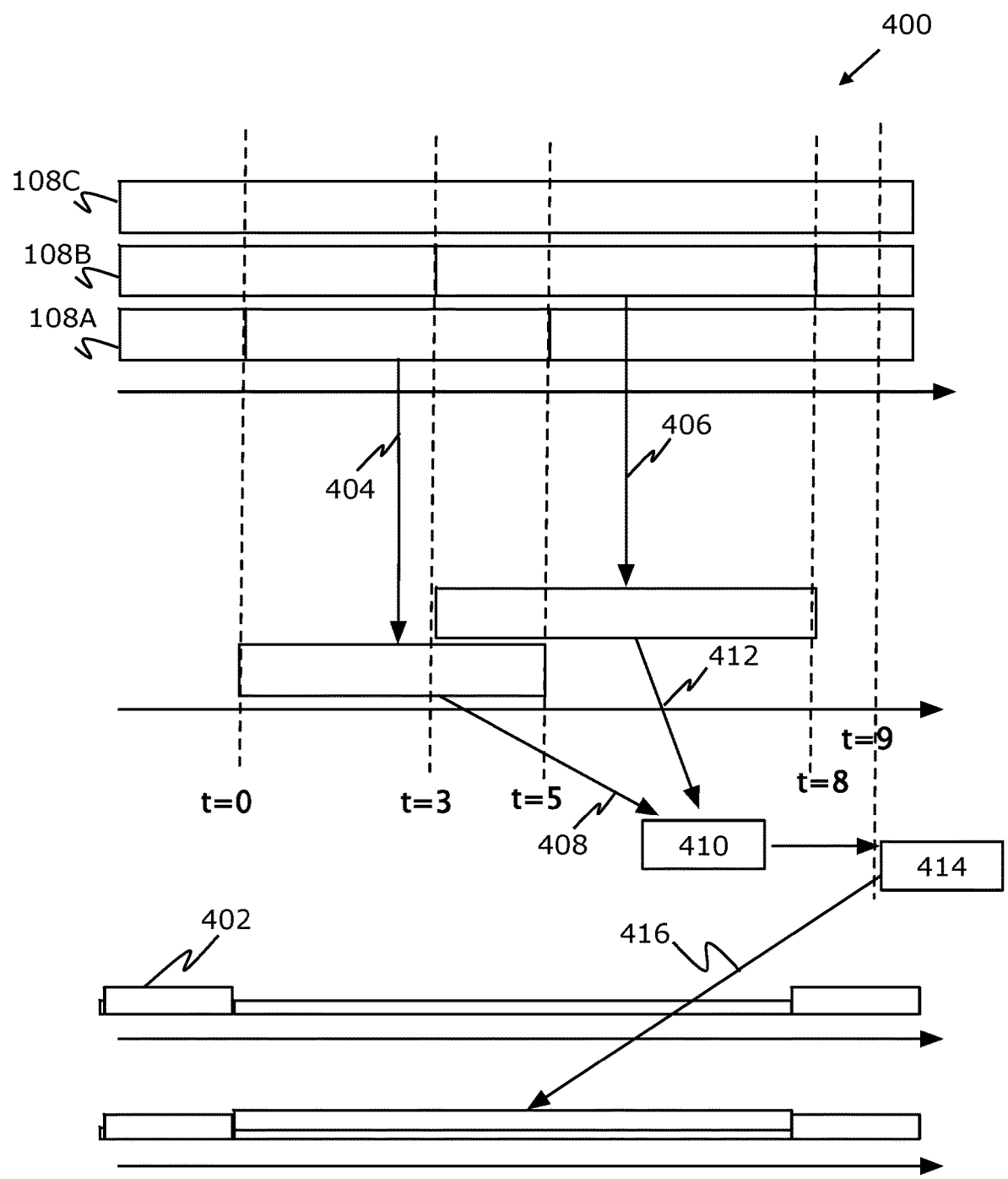
FIG. 4 is a timing diagram for correcting errors in location data, in accordance with an embodiment of the present disclosure.

Referring to FIG. 4, there is shown a timing diagram 400 for correcting errors in location data, in accordance with an embodiment of the present disclosure. The timing diagram 400 illustrates a base station 108A, a base station 108B and a base station 108C. Further, the timing diagram 400 illustrates a first set of location correction data streams over a time period 0 to t. The server system is configured to store a portion of the first set of location correction data streams based on the route of travel of the vehicle. At a step 402, location measurement raw data of the vehicle is recorded using the location measurement system of the vehicle during the travel. Further, the location measurement system is configured to indicate the location measurement raw data of the vehicle to the server system to prepare a first set of location correction data streams. At a step 404 (e.g. t=0 to t=5), the location correction data stream of the base station 108A is stored. At a step 406, (e.g. t=3 to t=8), the location correction data stream of the base station 108B is stored. At step 408, the stored location correction data stream related to the base station 108A is forwarded for pre-processing and compression to step 410. At step 412, the stored location correction data stream related to the base station 108B is forwarded for pre-processing and compression to the step 410. At a step 414, a second set of location correction data stream is acquired by the vehicle. At a step 416, the vehicle uses the second set of location correction data stream to post process collected raw data to transform it to accurate location data. Furthermore, the corrected accurate location data is then used to transform measured location data of objects around the rover route as accurate data.

The steps 402 to 416 are only illustrative and other alternatives can also be provided where one or more steps are added, one or more steps are removed, or one or more steps are provided in a different sequence without departing from the scope of the claims herein.

Figure 5:
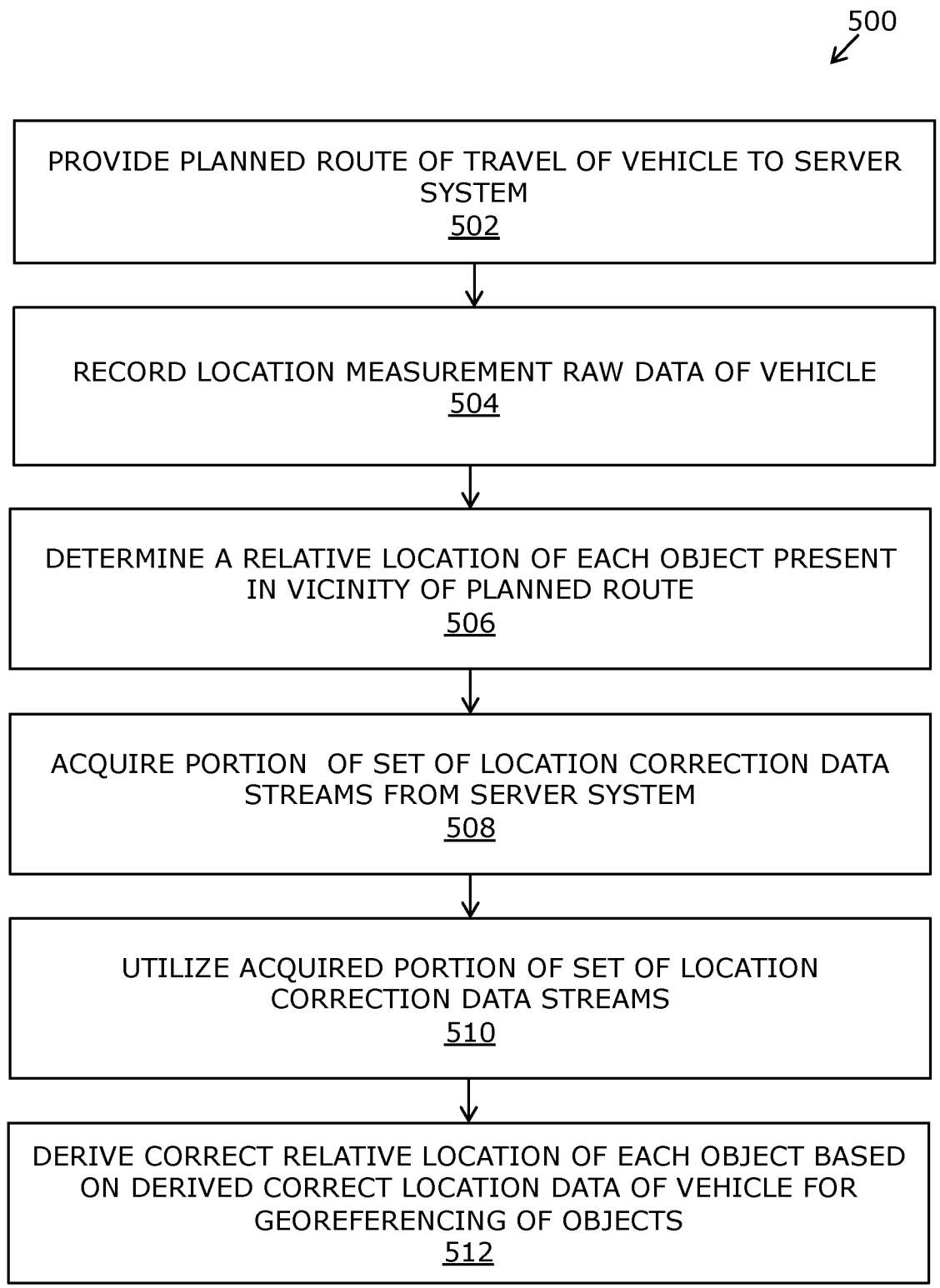
FIG. 5 is a flow chart of a method for correcting errors in location data, in accordance with an embodiment of the present disclosure.

Referring to FIG. 5, there is shown an illustration of steps of a method 500 for correcting errors in location data, in accordance with an embodiment of the present disclosure. At step 502, a planned route of travel of the vehicle is provided to a server system. At step 504, location measurement raw data of the vehicle is recorded by the vehicle using a location measurement system in the vehicle during the travel. At step 506, a relative location of at least one object of a plurality of objects present in a vicinity of the route of travel is determined by the vehicle with respect to a position of the vehicle. At step 508, a portion of a first set of location correction data streams is acquired by the vehicle from the server system. At step 510, the acquired portion of the first set of location correction data streams is utilized by the vehicle to determine errors in the location measurement raw data to derive correct location data of the vehicle from the location measurement raw data. At step 512, correct location of each object of the plurality of objects is derived based on the derived correct location data of the vehicle for georeferencing of the plurality of objects.

The steps 502 to 512 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for correcting errors in location data, the method comprising:

providing a planned route of travel of a vehicle to a server system;

using the planned route of travel to travel, with the vehicle, a route of travel;

recording, by the vehicle, a location measurement raw data of the vehicle using a location measurement system in the vehicle during the travel;

measuring, by a measurement sensor, at least one object that is in a vicinity of the route of travel;

determining, by the vehicle, a relative location of the at least one measured object of a plurality of objects present in the vicinity of the route of travel with respect to a position of the vehicle;

acquiring, by the vehicle, a portion of a first set of location correction data streams from the server system, wherein the acquired portion of the first set of the location correction data comprises a second set of location correction data streams, the second set of location correction data streams comprising relevant location correction data streams from one or more base stations for one or more time periods in accordance with a geographical area covered by the one or more base stations with respect to a timing associated with at least one of, the planned route of travel of the vehicle, the route of travel of the vehicle, a measured route of travel, or a forecasted route of travel; and utilizing, by the vehicle, the acquired portion of the first set of location correction data streams to determine errors in the location measurement raw data to derive correct location data of the vehicle from the location measurement raw data; and deriving a correct location of the at least one measured object of the plurality of objects based on the derived correct location data of the vehicle for georeferencing of the plurality of objects.

2. The method according to claim 1, further comprising acquiring, by the server system, the first set of location correction data streams from one or more base stations of a plurality of base stations.

3. The method according to claim 1, further comprising deriving, by the server system, the second set of location correction data streams from the first set of location correction data streams based on a geography associated with at least one of: the planned route of travel of the vehicle, the route of travel of the vehicle, a measured route of travel, or a forecasted route of travel.

4. The method according to claim 1, further comprising estimating, by the vehicle, the one or more time periods in which the vehicle is expected to be present in corresponding geographical areas covered by each of the one or more base stations based on the planned route of travel.

5. The method according to claim 4, further comprising utilizing, by the server system, the estimated the one or more time periods to derive the second set of location correction data streams relevant to the planned route of travel of the vehicle.

6. The method according to claim 1, further comprising performing one or more measurements for each object of the plurality of objects from one or more positions along the route of travel based on a number of location correction data streams of the first set of location correction data streams available for the one or more positions from one or more base stations.

7. The method according to claim 1, further comprising performing a first set of measurements for a first object of the plurality of objects when location correction data streams from the first set of location correction data streams are available from at least a first set of base stations from a plurality of base stations for a common geographical area, wherein the vehicle moves along the route of travel in order to perform the first set of measurements along the route of travel that is covered within the common geographical area.

8. The method according to claim 7, further comprising performing a second set measurements for a second object of the plurality of objects when location correction data streams from the first set of location correction data streams are available from at least a second set of base stations of the plurality of base stations for the common geographical area, wherein the vehicle moves along the route of travel in order to perform the second set of measurements along the route of travel that is covered within the common geographical area, and wherein a number of the second set of measurement is higher than a number of the first set of measurements and a number of base stations in the second set of base stations is lower than the number of base stations in the first set of base stations.

9. The method according to claim 1, further comprising:
   determining, by the vehicle, a current location of the vehicle utilizing:
      the location measurement raw data;
      the acquired portion of the first set of location correction data streams; and
   updating in real time or near-real time a location of each object of the plurality of objects based on at least the determined current location of the vehicle, wherein the updated location corresponds to the correct location of each object of the plurality of objects.

10. The method according to claim 9, wherein the determination of the current location of the vehicle on the route of travel is performed corresponding to a time period of a movement of the vehicle, and wherein the determination of the route of travel comprises vehicle state estimation.

11. A system for correcting errors in location data, the system comprising: control circuitry and a location measurement system in a vehicle, wherein the control circuitry is configured to:
   provide a planned route of travel of a vehicle to a server system;
   use the planned route of travel to travel, with the vehicle, a route of travel;
   record a location measurement raw data of the vehicle using a location measurement system in the vehicle during the travel;
   measure at least one object that is in a vicinity of the route of travel;
   determine a relative location of the at least one measured object of a plurality of objects present in the vicinity of the route of travel with respect to a position of the vehicle;
   acquire a portion of a first set of location correction data streams from the server system, wherein the acquired portion of the first set of location correction data comprises a second set of location correction data stream, the second set of location correction data streams comprising relevant location correction data streams form one or more base stations for one or more time periods in accordance with a geographical area coved by the one or more base stations with respect to a timing associated with at least one of: the planned route of travel of the vehicle, the route of travel of the vehicle, a measured route of travel, or a forecasted route of travel;
   utilize the acquired portion of the first set of location correction data streams to determine errors in the location measurement raw data to derive correct location data of the vehicle from the location measurement raw data; and
   derive a correct location of the at lease one measured object of the plurality of objects based on the derived correct location data of the vehicle for georeferencing of the plurality of objects.

12. The system according to claim 11, wherein the control circuitry is further configured to estimate one or more time periods in which the vehicle is expected to be present in corresponding geographical areas covered by each of the one or more base stations based on the planned route of travel.

13. The system according to claim 12, wherein the control circuitry is further configured to communicate the estimated one or more time periods along with the planned route of travel to the server system.

14. The system according to claim 11, further comprising a plurality of measurement sensors, wherein the control circuitry is further configured to perform, by use of the plurality of measurement sensors, one or more measurements for each object of the plurality of objects from one or more positions along the route of travel based on a number of location correction data streams of the first set of location correction data streams available for the one or more positions from one or more base stations.

15. The system according to claim 11, wherein the location measurement system includes at least a global navigation satellite system receiver, wherein the location measurement raw data is raw global navigation satellite system satellite data.

* * * * *